Oct. 30, 1962          J. W. HICKS, JR          3,060,789
                    LIGHT-CONDUCTING FIBERS
                     Filed Aug. 28, 1958
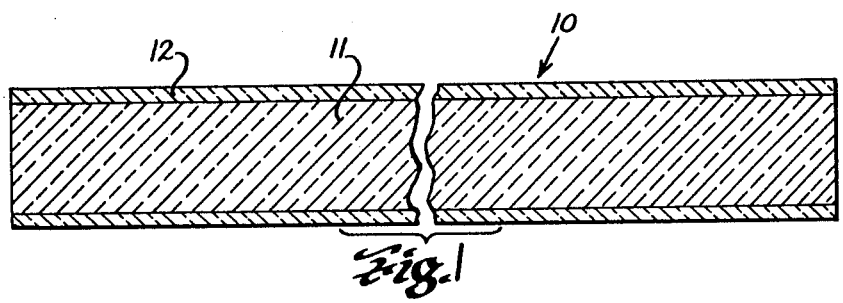
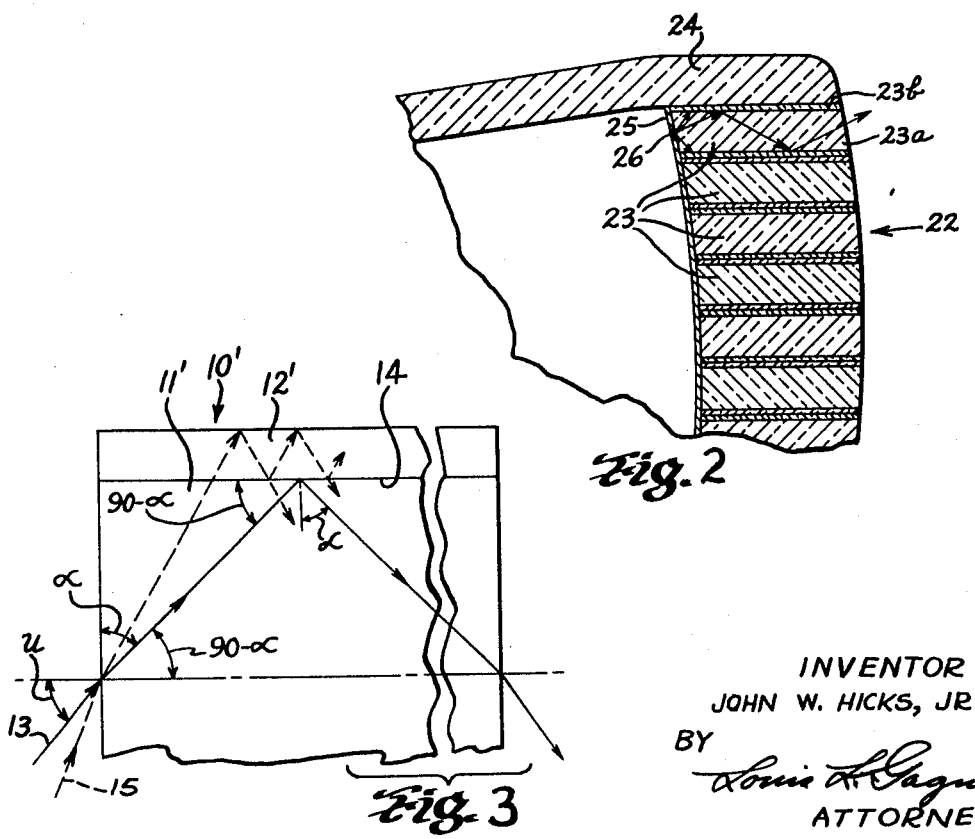
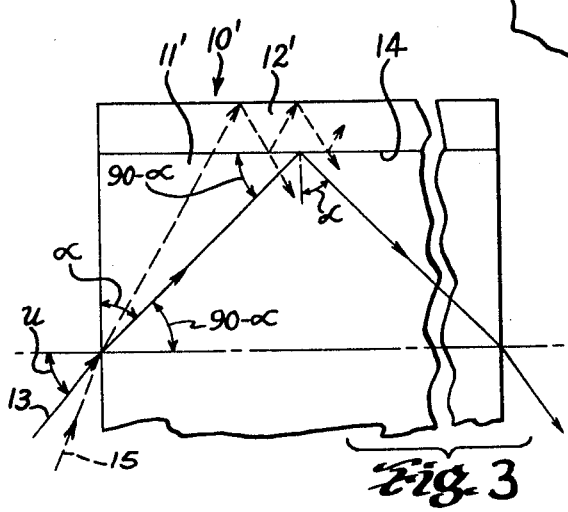
INVENTOR
JOHN W. HICKS, JR.
BY Louis L. Gagnon
ATTORNEY

United States Patent Office 3,060,789
Patented Oct. 30, 1962

3,060,789
LIGHT-CONDUCTING FIBERS
John W. Hicks, Jr., Fiskdale, Mass., assignor to American Optical Company, Southbridge, Mass., a voluntary association of Massachusetts
Filed Aug. 28, 1958, Ser. No. 757,850
2 Claims. (Cl. 88—1)

This invention relates to light-conducting fibers or the like and light-transferring devices formed therefrom and has particular reference to improvements in light-conducting fibers of the light-insulated or clad type having core parts of glass or similar materials of a relatively high index of refraction and further having outer coatings or claddings of light absorbent glass or other similar materials of a relatively low index of refraction.

In making light-conducting fibers of the above character, it has been the usual practice to select glasses (or other similar materials) for the core and cladding parts thereof which differ sufficiently in index of refraction to provide the fiber with a relatively large aperture angle of the entering light which will be totally transmitted through the core of the fiber from end to end. Light entering fiber optical light-transferring devices formed of fibers of the above character from angles greater than the aperture angles of the particular fibers will not be completely transmitted through the core parts of the fibers since in entering the fibers, it will strike the interfacial surface between the core and cladding parts thereof at an angle beyond the critical angle of reflection of said surface and pass into the claddings and thereafter be scattered or refracted into adjacent fibers to form a background of stray light.

In instances where such devices are used to conduct or transfer image-forming light, the above-mentioned background of stray light is extremely disturbing in that it tends to dilute or wash out the image-forming light being transferred through the core parts of the fibers and, in general, reduces the efficiency of the fibers.

A primary object of this invention is to provide improved light-conducting fibers and/or light-transferring devices of the above-mentioned light-insulated or clad type which are adapted to efficiently transfer, from end to end, all light which enters the same within the maximum aperture angles of the fibers with substantially no interference from light which enters said fibers at angles greater than said maximum aperture angles thereof.

Another object is to provide improved coated or clad light-conducting fibers of the above character wherein said coatings or claddings are adapted to attenuate stray light within the fibers substantially without sacrifice of the overall light-conducting efficiency of the fibers.

Another object is to provide light-absorbing coating or cladding materials for light-conducting fibers which materials, when in use, will absorb substantially only light which has entered the fibers at angles beyond the critical angle of reflection at the interface between the light-conducting core and cladding parts of the fibers.

A further object is to provide a light absorbing coating or cladding on light-conducting fibers which cladding is of a material permitting the fibers to be reworked as by reshaping and/or redrawing either individually or in assembled or grouped formation.

A still further object is to provide simple, efficient and relatively economical means for improving the light-conducting efficiency of coated or clad light-conducting fibers or devices formed therefrom.

Other objects and advantages of the invention will become apparent from the following description when taken in conjunction with the accompanying drawings in which:

FIG. 1 is a greatly enlarged longitudinal cross-sectional view of a light-conducting fiber of the type embodying the invention;

FIG. 2 is an enlarged fragmentary cross-sectional view of a cathode ray tube face plate which has been formed of light-conducting fibers of the character of this invention, said face plate being shown to illustrate the fibers of the invention in a condition of use; and FIG. 3 is a diagrammatic illustration showing the light-conducting characteristics of the coated or clad light-conducting fibers of the invention.

In FIG. 1, there is shown a light-conducting fiber 10 which, for purposes of illustration, will be considered to be formed of glass and embodying a core 11 of a high-index flint glass or the like with a relatively thin outer coating or cladding 12 of a relatively low-index light-absorbing glass which will be discussed in greater detail hereinafter. The opposite ends of the fiber 10 are optically finished to render the same receptive to light.

Fibers such as shown in FIG. 1 may be constructed by placing a rod-like member of the high-index glass within a tubular member of the low-index glass, heating and causing said tubular member to collapse and fuse with the rod-like member, heating the assembly thus formed to a suitable fiber-drawing viscosity and thereafter drawing the assembly down to a desired fiber size. It is pointed out that light-conducting fibers of the type embodying this invention may be formed by any of the known techniques common to the manufacture of conventional individually light-insulated or clad fibers.

In FIG. 3, there is diagrammatically illustrated, for purposes of better understanding this invention, a greatly enlarged portion of a light-conducting fiber 10' having a core part 11' and a cladding 12'. A maximum entrance angle $u$ is shown in FIG. 3 at which a ray of light 13 may enter the fiber 10' and be totally reflected at the interfacial surface 14 between the core 11' and cladding 12', the critical angle of reflection in this case being the angle $\alpha$. All rays of light entering the core 11' and striking the interface 14 at a greater angle than $\alpha$ will be substantially totally reflected at the surface 14. However, light rays such as 15 which enter the fiber at an angle greater than $u$ will strike the interface at an angle smaller than the critical angle of reflection $\alpha$ and pass on into the cladding 12' to be at least partially reflected back into the core part 11' as a background of stray light generally in the manner illustrated by the dash lines. A measure of the maximum aperture angle of the entering light which will be transmitted through the fiber from end to end may be made as follows where $n_1$ is the index of refraction of the core 11' and $n_2$ is the index of refraction of the cladding 12':

$$\sin(90-\alpha) = \cos\alpha$$

$$\sin u = n_1 \cos\alpha$$

$$\cos\alpha = \sqrt{1-\sin^2\alpha}$$

$$\sin u = n_1\sqrt{1-\sin^2\alpha}$$

$$\sin^2 u = \frac{n_2^2}{n_1^2}$$

$$\sin u = n_1\sqrt{1-\frac{n_2^2}{n_1^2}}$$

$$\sin u = \sqrt{n_1^2 - \frac{n_1^2 n_2^2}{n_1^2}}$$

$$\sin u = \sqrt{n_1^2 - n_2^2}$$

In accordance with this invention, the cladding 12 of the fiber 10 is formed of a light-absorbing glass having carefully selected absorption characteristics such that substantially only the light entering the fiber 10 within the maximum aperture angle of the fiber will be transferred through the fiber, whereas light entering the fiber at angles beyond the maximum aperture angle will be absorbed by the cladding 12 upon striking the interface between the core and cladding.

The selection of the cladding and core glasses which, in combination with each other, will produce the above results is made in accordance with the cross-sectional sizes and lengths desired of the fibers and the relative thickness of the core and cladding parts thereof as follows:

Let $k=$ the ratio of volume of cladding glass to core glass which is determined from the relative clad thickness desired of the fiber to be fabricated and let $l=$ the length of said fiber. Then, in a thickness $kl$ of the light absorbing cladding glass which is to be used to clad the fiber, the absorption should be sufficient to give a transmission of approximately 10%. Any transmission appreciably over 10% will permit an undesirable amount of stray light to re-enter the core part of the fiber and any transmission appreciably below said 10% will cause the coating to absorb an undesirable amount of the light entering the fiber within its maximum aperture angle. For example, if a fiber were to be constructed 12 inches long with a light absorbing cladding which is of a thickness equal to 10% of the overall thickness of the fiber, the absorption of the cladding glass should be such as to cause a sample or piece of said glass which is 1.2 inches thick to transmit approximately only 10% of light which is directed therethrough.

It is to be understood that the degree of absorption required for the cladding glass would be greater if signal to noise ratio (image light to background light) is of extreme importance or less if maximum signal transmission (transmission of image light only) is of greatest importance.

A neutral light-absorbing crown glass suitable for use in forming light absorbing coatings of the character of this invention may be formed by mixing equal quantities of chromic oxide and gold chloride with a relatively low index crown glass during the making of the crown glass in amounts controlled in accordance with the degree of light absorption desired of said glass. It is emphasized that this invention is in no way restricted to the particular glass composition just given since the techniques used to produce light absorbing glass are numerous and well known to those skilled in the glass making industry. Furthermore, it may be desirable, for certain applications of use, to form fibers of the above type with light absorbing coatings or claddings which are not neutral. That is, rather than being absorptive to white light it may be desirable to render said claddings absorptive to light at other points on the spectrum such as ultra-violet, infra-red, or the like, light absorbing glasses of this type also being well known in the art of glass making.

Fibers such as shown in FIG. 1 may be fabricated by placing a rod of core glass 11 within a tube of the cladding glass 12 having a sidewall thickness carefully proportioned in accordance with the relative thicknesses desired of the core and cladding parts of the fiber to be formed and having light absorbing abilities such as discussed above. When assembled, the rod and tube are heated to a fiber drawing viscosity and drawn to fiber size whereupon the relative thicknesses of the core and cladding parts will retain the proportions of the initial rod and tube assembly regardless of the extent to which said assembly is drawn. The light absorbing coating 12 of the fiber, being of a glass or other similar heat softenable material, will permit fibers of the character of this invention to be formed by conventional fiber drawing techniques and accordingly will permit said fibers to be reshaped or redrawn as desired, either individually or as a group in assembled relation with each other. In any case, a reshaping or redrawing of the fibers will not alter the light-conducting and light-absorbing capabilities of the fibers.

It is pointed out that fibers of the character of this invention are readily adaptable to all fiber optical devices and are of particular value when used in the fabrication of optical image-forming and transporting or transferring devices such as, for example, a cathode ray tube face plate 22 of the type diagrammatically illustrated in FIG. 2 wherein a multiplicity of clad light-conducting fibers 23 are connected together in side-by-side relation with each other and optically finished at their opposite ends to form means by which image-forming light produced internally of the tube 24 may be directly transferred through the face plate 22 and received at its front surface.

With the phosphor 25 of the kinescope 24 placed in optical contact with the inner ends of the fibers 23, it is obvious that from each point source of light 26 which is produced by the phosphor, a full Lambertian cone of light will be directed into the core glass 23a of the fibers 23. That is, light rays will enter the fiber throughout a full 180° angle and, therefore, a substantial portion of said light rays which enter the core glass 22 at an angle beyond the critical angle of reflection at the interface between the core glass 23a and the cladding 23b will pass into the core glass 23a. In conventional clad fibers, the light entering the claddings of the fibers would be partially transferred through the same and into adjoining fibers and partially reflected back into the original fiber whereby said light would be scattered throughout the fibers of the face plate 22 as background of stray light. Since the exit ends of the fibers are in air, they will not allow light approaching the same at excess angles to emerge therefrom, portions of said stray light which get back to the phosphor cause a washing out or dilution of the original image-forming light produced thereby and cause an overall deterioration of the total image at the viewing face of the tube 24.

By fabricating face plates such as 22, or other similar fiber optical devices, of fibers which are constructed in accordance with this invention, the light-absorbing cladding of the fibers will prevent said light entering the fibers at angles beyond the critical angles of reflection thereof from destroying the image-forming light which is passed from end to end through the fibers.

It is to be understood that the face plate 22 of FIG. 2 has been shown and described as an example of one use for light-conducting fibers of the type embodying this invention and that other devices such as endoscopes, gastroscopes or fiber optical probes of all types may be rendered more efficient in transferring image-forming light if constructed of light-conducting fibers of the character of this invention.

From the foregoing, it will be seen that simple, efficient and economical means have been provided for accomplishing all the objects and advantages of the invention as expressed in the accompanying claims and the invention is not to be limited to the exact matters shown and described as only the preferred matters have been given by way of illustration.

Having described my invention, I claim:

1. A fiber optical image transfer device comprising a plurality of light-conducting optical fibers which are secured together in side-by-side relation so that corresponding opposite ends of the fibers cooperate to define respective light-receiving and light-emitting faces, each of said fibers consisting of a core part of a transparent material of relatively high index of refraction and a single cladding of partially transparent and partially absorbing material of relatively low index of refraction, said core and cladding of each fiber forming an interface highly internally reflective to portions of light entering one of said faces of said fibers as image-forming light and incident upon said interface at angles greater than the critical angle of reflection of said interface with relatively little absorption so as to transfer the major portion of said image-forming light to the other of said faces and said interface being transmissive to portions of light entering said fibers smaller than said critical angle of reflection and which passes through the cladding into adjacent fibers to thereby produce undesired background light in an image transferred by the device, said cladding material having controlled absorptive and transmissive properties for absorbing a significant part of said undesired background light which is incident upon said interfaces smaller than said critical angle, whereby the undesired background light is substantially absorbed with relatively limited absorption of said image-forming light.

2. A fiber optical image transfer device comprising a plurality of light-conducting optical fibers which are secured together in side-by-side relation so that corresponding opposite ends of the fibers cooperate to define respective light-receiving and light-emitting faces, each of said fibers consisting of a core part of a transparent material of relatively high index of refraction and a single cladding of partially transparent and partially absorbing material of relatively low index of refraction, said core and cladding of each fiber forming an interface highly internally reflective to portions of light entering one of said faces of said fibers as image-forming light and incident upon said interface at angles greater than the critical angle of reflection of said interface with relatively little absorption so as to transfer the major portion of said image-forming light to the other of said faces and said interface being transmissive to portions of light entering said fibers smaller than said critical angle of reflection and which passes through the cladding into adjacent fibers to thereby produce undesired background light in an image transferred by the device, said cladding material having controlled absorptive and transmissive properties such that a thickness $Kl$ of said cladding material will transmit substantially only 10% of the light directed thereinto when $K$ equals the ratio of the volume of the cladding material to the core material of said fibers and $l$ equals the length of said fibers, whereby a selected part of the undesired background light which is incident upon said fiber interfaces smaller than said critical angle of reflection will be substantially absorbed with relatively limited absorption of said image-forming light.

References Cited in the file of this patent

UNITED STATES PATENTS

| | | |
|---|---|---|
| 1,273,346 | Fagan | July 23, 1918 |
| 1,848,814 | Allen | Mar. 8, 1932 |
| 2,635,390 | Parker | Apr. 21, 1953 |
| 2,652,660 | Kurz | Sept. 22, 1953 |
| 2,825,260 | O'Brien | Mar. 4, 1958 |
| 2,877,368 | Sheldon | Mar. 10, 1959 |

FOREIGN PATENTS

| | | |
|---|---|---|
| 725,509 | Great Britain | Mar. 2, 1955 |

OTHER REFERENCES

"A New Method of Transporting Optical Images Without Aberrations," Van Heel, Nature, vol. 173, No. 4392, Jan. 2, 1954, page 39.